United States Patent
Lee et al.

(10) Patent No.: US 7,482,803 B2
(45) Date of Patent: Jan. 27, 2009

(54) INDUCTIVE POSITION SENSOR USING REFERENCE SIGNAL

(75) Inventors: Joong K. Lee, Chatham (CA); Ryan W. Elliott, Chatham (CA)

(73) Assignee: KSR Technologies Co., Ridgetown (CA)

( * ) Notice: Subject to any disclaimer, the term of this patent is extended or adjusted under 35 U.S.C. 154(b) by 0 days.

(21) Appl. No.: 12/016,366

(22) Filed: Jan. 18, 2008

(65) Prior Publication Data

US 2008/0174302 A1 Jul. 24, 2008

Related U.S. Application Data

(60) Provisional application No. 60/885,736, filed on Jan. 19, 2007.

(51) Int. Cl.
 *G01B 7/30* (2006.01)
 *G01B 7/00* (2006.01)
(52) U.S. Cl. .............. 324/207.25; 324/207.17; 324/207.24
(58) Field of Classification Search ................
 324/207.15–207.17, 207.24, 207.25; 73/514.31, 73/514.39; 33/706, 708; 336/30, 45
 See application file for complete search history.

(56) References Cited

U.S. PATENT DOCUMENTS

| 5,563,922 | A  | 10/1996 | Beltz et al. |
| 6,304,076 | B1 | 10/2001 | Madni et al. |
| 6,756,779 | B2 | 6/2004  | Gleixner et al. |
| 6,943,543 | B2 | 9/2005  | Gass et al. |

*Primary Examiner*—Bot LeDynh
(74) *Attorney, Agent, or Firm*—Gifford, Krass, Sprinkle, Anderson & Citkowski, P.C.

(57) ABSTRACT

An apparatus providing a signal related to a position of a coupler element comprises an exciter coil and a receiver coil, the apparatus being operable to provide a signal correlated with the position of the coupler element using a receiver signal generated when the exciter coil is energized due to an inductive coupling between the receiver coil and the exciter coil. In some examples, the receiver coil has first and second sections generating a first section signal and a second section signal respectively, and an electronic circuit is operable to generate a position-independent signal using the first section signal and the second signal. This position-independent signal may then be subtracted from a baseline voltage to provide an improved reference signal for ratiometric position sensing.

15 Claims, 16 Drawing Sheets

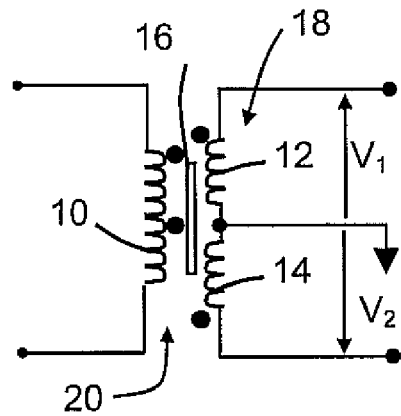
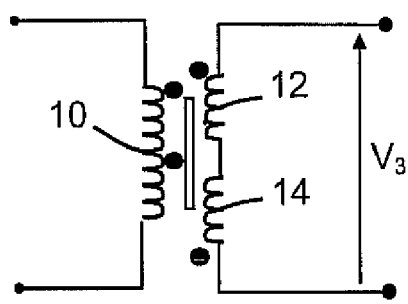
FIG – 1A          FIG – 1B
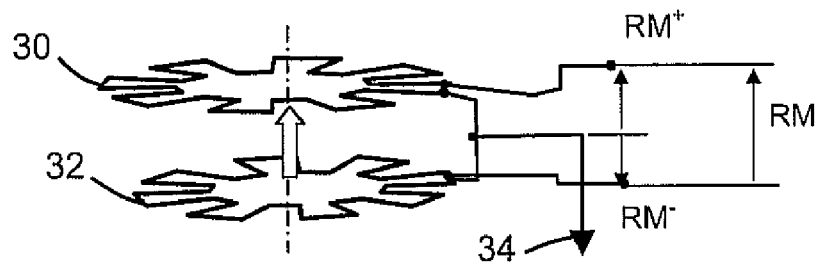
FIG – 2
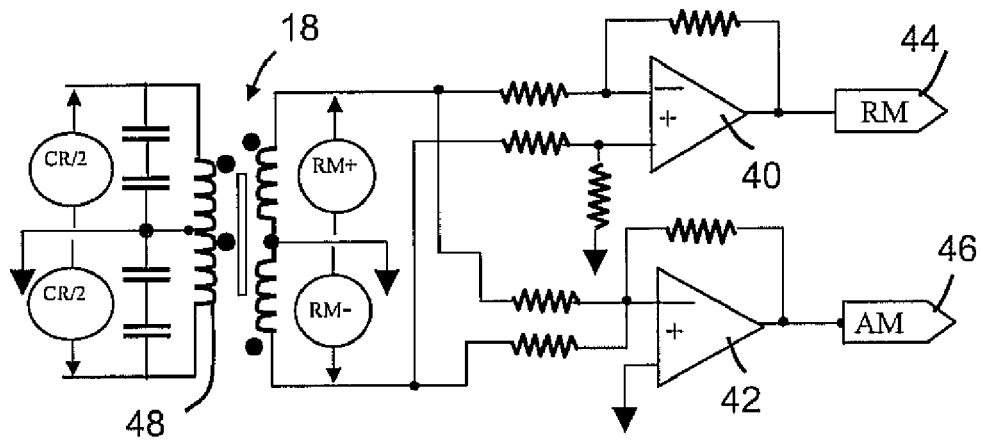
FIG – 3

R M forward + R M backward signal

R T position from min to max ratio

INDUCTIVE POSITION SENSOR USING REFERENCE SIGNAL

REFERENCE TO RELATED APPLICATION

This application claims priority from U.S. Provisional Patent Application Ser. No. 60/885,736, filed Jan. 19, 2007, the entire content of which incorporated herein by reference.

FIELD OF THE INVENTION

The present invention relates to position sensors, in particular to inductive position sensors.

BACKGROUND OF THE INVENTION

Signals from the receiver coils of inductive sensors are prone to variation due to noise and manufacturing variations, for example variations in part separations. Improved sensors giving positional signals corrected for such common mode factors would be of great commercial interest, particularly for electronic throttle control applications, amongst many other possible applications.

SUMMARY OF THE INVENTION

This invention relates to an inductive sensor for providing electrical signals related to the position of a mechanical part, including linear and/or rotational position sensors. Embodiments of the invention may be used with an electronic throttle control. The part whose position is to be sensed may be mechanically coupled to a coupler element.

An example inductive position sensor comprises an exciter coil, one or more receiver coils, and a coupler element. The coupler element modifies the inductive coupling between the exciter coil and the receiver coil(s) according to the part position. The part position is determined from a receiver signal, obtained from the receiver coil(s). If there is a plurality of receiver coils, each providing a receiver signal, one receiver signal may be selected according to the positional range, or other factor. The receiver signal is sensitive to the part position, at least over a positional range, and also sensitive to common mode factors such as excitation voltage, manufacturing variations (such as gap between a coil assembly and the coupler element), electrical noise, ambient or local conditions such as temperature, or other factor.

The accuracy of the positional signal can be improved using a reference signal, for example using ratiometric approach where a ratio is formed of the receiver signal and the reference signal. The reference signal is preferably substantially independent of the part position, at least along the positional direction of interest (the intended motion), but susceptible to some or all of the common mode factors as act on the receiver coils. Hence, errors due to common mode factors can be reduced or substantially eliminated by obtaining a ratiometric signal, formed as a ratio of a receiver signal to a reference signal. The effect of common mode factors may then be substantially eliminated by forming the ratio. The reference signal can be provided by a separate reference coil, for example configured to be excited by the same flux as excites the receiver coil(s).

In some examples of the present invention, a reference signal is obtained without the need for a separate reference coil. The reference signal is determined using signals obtained from the one or more receiver coils. This allows simplification of the coil assembly, reduced cost, and improved reliability. Further, the degree of elimination of common mode factors can be improved. Thermal robustness may also be improved, if the number of layers on a multi-layer circuit board based coil assembly is reduced. For example, the receiver coil may be provided with a center tap, with oppositely wound sections each side of the center tap. A receiver signal and reference signal can then both be obtained from the receiver coil.

In some applications, it is preferable to modify the reference signal through a step of obtaining a first signal substantially independent of coupler element position, then subtracting the first signal from a second value. For example, in some electronic throttle controls, there is a gap between a coil assembly and the coupler element. For a rotational sensor, the gap may be along (or parallel to) the central axis of rotation. The receiver signal tends to increase as the gap decreases. Using a center tapped receiver coil, a first signal may be obtained that is substantially independent of part position, but which tends to decrease as the gap decreases. By subtracting the first signal from a higher baseline level, a second signal may be obtained that increases as the gap decreases. The higher baseline level may be obtained from the exciter signal, for example using an impedance bridge (resistive and/or capacitive), or an isolation transformer.

In an example approach, a receiver coil having a plurality of sections is used, and a plurality signals so obtained is combined to obtain a reference signal substantially independent of part position. For example, if the receiver coil is tapped, the tap may be located between oppositely wound sections of the receiver coil. The sum of the magnitudes of two signals obtained from the sections can then be used to obtain a signal independent of coupler position. As a coupler element moves relative to the coil assembly, inductive coupling to a first section, having a first winding direction, may decrease, whereas inducting coupling to a second section having an opposed (to the first section) winding direction. Combining the signals in a differential manner obtains a position-sensitive signal correlated with the coupler element position. As inductive coupling to the first receiver coil section decreases, the position sensitive signal will contain more of a contribution from the second section. However, by adding the magnitudes of the signals, a signal substantially independent of coupler position is obtained.

In another example approach, a plurality of receiver coils is used, and a reference signal obtained by combination of signals from the plurality of receiver coils.

An example receiver coil has a center tap dividing two sections. The receiver signal is obtained from the ends of the receiver coil, and the two sections contribute opposed voltages to the receiver signal. This configuration may be termed "differential", as the receiver signal is the difference between the magnitudes of the voltages induced in the two sections. The reference signal is obtained as the sum of the magnitudes of the voltages in each section.

In other examples, the reference signal can be provided by a single loop. The magnitude of the reference signal may be increased by locating a ferromagnetic plate proximate to the reference coil. In some examples, additional coil structures outside of a generally circular loop may be added, and inclusion of a ferromagnetic core to such additional coil structures further increases the magnitude of the reference signal so obtained.

The reference signal can be modified before ratiometric signal processing is applied. In some examples, it can be useful for the reference signal used for signal processing to go to a lower value (possibly a minimum value, such as zero) when the coupler element is removed. The receiver signal from a differential receiver coil may typically go to a minimum when the coupler element is removed, as the signals from the oppositely wound sections cancel out. Hence, the reference signal obtained from the coil assembly may be subtracted from a baseline voltage before ratiometric signal processing (or any other type of signal processing) is applied. The baseline voltage may be provided by an isolation transformer (e.g. in series with the exciter coil), or be otherwise derived from the excitation voltage applied to the exciter coil (e.g. by capacitive or resistive voltage dividers in parallel with the excitation coil), or may be a predetermined value obtained from any source. Using this subtraction step, the baseline voltage may be adjusted to give a reference signal having a similar trend versus a common mode factor (such as temperature or gap relative to a coupler element) as is observed in a position-dependent signal, allowing the effects of the common mode factor to be more accurately removed. The baseline voltage may be chosen to be approximately equal to the highest value of reference signal voltage theoretically (or practically) observed.

An example apparatus for providing a signal related to a position of a coupler element, comprises an exciter coil operable to generate magnetic flux when energized, a receiver coil operable to generate a receiver signal due to an inductive coupling between the receiver coil and the exciter coil when the latter is energized, the receiver coil having first and second sections generating a first section signal and a second section signal respectively, and an electronic circuit operable to generate a position-dependent signal using the receiver signal, and a position-independent signal using the first section signal and the second section signal. The inductive coupling is modified through spatial modulation by movement of the coupler element so that the receiver signal is correlated with the position, and the position-independent signal is substantially independent of the position of the coupler element. An improved reference signal, also being substantially independent of the position of the coupler element, can be generated by subtracting the position-independent signal from a baseline voltage. The electronic circuit may generate a ratiometric signal, correlated with position, using the position-dependent signal and the reference signal. In other examples, the apparatus has a reference coil, the reference coil being operable to provide a position-independent signal when the exciter coil is energized due to an inductive coupling between the reference coil and the exciter coil.

Examples of the present invention include rotational position sensors, and linear position sensors. Particular examples include electronic throttle controls.

BRIEF DESCRIPTION OF THE DRAWINGS

FIGS. 1A and 1B illustrate signals that may be obtained from a tapped receiver coil;

FIG. 2 shows generation of a signal dependent on coupler position and a signal substantially independent of coupler position;

FIG. 3 shows an electronic circuit for obtaining a reference signal and receiver signal from a receiver coil having a center tap;

DETAILED DESCRIPTION OF THE INVENTION

Figure 4:
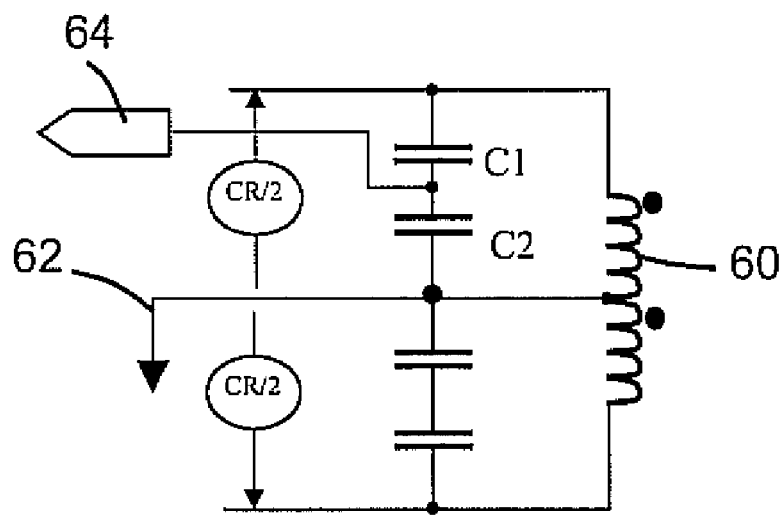
FIG. 4 shows a baseline voltage obtained from the exciter signal using a voltage divider.

An apparatus for providing a signal related to a position of a movable part comprises an exciter coil, and a receiver coil disposed proximate to the exciter coil. The exciter coil generates magnetic flux when the exciter coil is energized by a source of electrical energy, such as an alternating current source. The receiver coil generates a receiver signal when the exciter coil is energized, due to an inductive coupling between the receiver coil and the exciter coil. A position sensor may sense linear motion, rotational motion (including multi-turn rotation sensors, or a combination of linear and rotational motion.

The inductive coupling is modified by movement of the part so that the receiver signal is related to the position of the part. For example, a coupler element may be mechanically coupled to the part, so that the coupler element modifies the inductive coupling between the exciter coil and the receiver coil as it moves, so that the receiver signal is related to the coupler position and hence the part position. The coupler element may comprise a metal plate, generally U-shaped metal structure, conducting loop, or other structure that modifies the inductive coupling between the transmitter coil and the receiver coil(s). The coupler element may act as an eddy plate that blocks the magnetic flux coupling between the exciter coil and the receiver coil(s).

The receiver coil may include a plurality of sections, the inductive coupling tending to induce opposed voltages in at least two of the sections. This structure is turned a differential structure, as the output voltage may be considered the difference between the magnitudes of induced voltages. The sensor can be configured so that the receiver coil output is substantially zero if the coupler element is removed.

A coil assembly may be formed that includes the exciter coil, one or more receiver coils, and an optional reference coil. The coil assembly may be formed on a substrate, for example as metal tracks on a printed circuit board which can also be used to support an electronic circuit for signal processing.

An electronic circuit may be provided operable to generate a positional signal that has a substantially linear relationship with the position to be measured, either as a voltage versus linear position, voltage versus angular position, position along a curved path, or other position that is a combination of linear motion and rotation. The part position may be a position of a pedal, movement of the pedal being mechanically coupled to the position of the coupler element, for example for electronic throttle applications, steering column turn sensors, fuel tank sensors, and the like. The apparatus may comprise an electronic circuit operable to providing a speed control to an engine.

In some embodiments, a reference signal is used to compensate for variations in the receiver signal that are not related to part position. These may be termed common mode factors, and include electrical noise, supply voltage variations, and manufacturing variations such as the gap between the coupler element and the coil plane(s) (for example, on a circuit board having the coil assembly and associated electronic module). The reference signal is substantially independent of the position of the part of interest when the exciter coil is energized, and can be used for ratiometric signal processing (such as an analog division of a receiver signal by the reference signal) to correct the position-dependent signals for common mode factors. For example, the reference signal may be substantially insensitive to part position along a direction of measurement, but may be sensitive to variations in other directions, such as those introduced by manufacturing variations.

The reference signal is preferably generated using signals arising from inductive coupling between the exciter coil and one or more other coils. In some examples, a separate reference coil may be used. In other examples, a reference signal is generated from signals obtained from receiver coils. Tapping of receiver coils may be used to obtain signals from which the reference signal is then obtained.

A reference signal may be used to estimate the gap or offset between the coil assembly and a coupler element, for example to determine a number of turns made in a multi-turn rotation sensor (multi-turn sensor). The reference signal may be obtained by combining receiver signals (the term in this context including signals obtained from sections of receiver coils), or from a separate reference coil. A separate reference coil and signal therefrom may also be used for turn monitoring (in a multi-turn sensor, for example to measure a separation that varies with rotation of the steering column), sensor troubleshooting diagnosis, and the like. A reference signal obtained from receiver coil(s) can be used for the same purposes. Hence, the reference signal can be mapped to a number of turns, and an appropriate voltage level selected to obtain the correct output. This allows a multi-turn sensor without gearing down, with an output beyond that at which signals would otherwise start to repeat (the modulus limit). The voltage level of the system can be selected to increase the range of the sensor, for example by adding offset values to the system ground.

An example apparatus for determining a part position of a part comprises: an exciter coil, the exciter coil generating magnetic flux when the exciter coil is energized by a source of electrical energy; a plurality of receiver coils disposed proximate to the exciter coil, the receiver coils generating a plurality of receiver signals when the exciter coil is energized due to an inductive coupling between the receiver coils and the exciter coil; a moveable coupler element having a position correlated with the part position, the coupler element modifying the inductive coupling between the exciter coil and the receiver coils so that each receiver signal is correlated with the part position; and an electronic circuit providing a ratiometric signal derived from at least one of the receiver signals and a reference signal.

The reference signal may be used to compensate for variations in the receiver signal that is not correlated with the coupler position, such as noise, supply voltage variations, and manufacturing variations. The reference signal may be obtained from combination of receiver signals, or from signals obtained from sections of received coils by tapping the coils. For example, a reference signal can be obtained from non-phase-sensitive rectification two or more signals from receiver coil(s) or sections thereof.

The voltage level of the system can be adjusted, for example by connecting one signal of RM to another to increase the linear range of rotational signal beyond the modulus angle. In this context, the linear range is one over which the receiver signal is linear with rotation angle.

The sensor range can be extended, for example by tracking the number of turns or other modulus angle that the part has turned through. The AM signal (reference signal) can be mapped to the number of turns. This is direct relation from AM output with modulus information, which will determine voltage level of system to measure beyond modulus limit.

The electronic module (or module) may be an ASIC module for signal conditioning, i.e., a device to drive sensor assembly to get the output.

A coil body for a rotational sensor may comprise axial modulators (reference coils, also termed AM coil(s) or proximity sensing coil(s), rotational modulators (RM, receiver coils), and carriers (exciter coils, or transmitter coils) which generates the magnetic/electric field.

In some examples, such as rotational sensors for electronic throttle control applications, the reference signal can be used to correct for variations in the gap between the coupler element and the receiver coils. The gap is measured along the axial direction of the coils, and so a separate reference coil may be termed an Axial Modulator (AM, or Proximity sensing coil). Similarly, a reference signal may be termed an AM signal. A receiver coil provides a signal dependent on rotation, and may be termed a Rotational Modulator (RM). There may be one or more receiver coils. The receiver coil may be tapped at one or more locations to allow generation of a reference signal. The exciter coil may also be called a transmitter coil or Carrier (CR). However, examples can be adapted for various configurations, such as linear sensors, and the reference to, e.g. a RM coil as an illustrative example does not limit the inventive concepts to rotation sensors only.

Some examples may use a modulator/demodulator signal analysis. A modulator allows a signal containing rotational angle signal (or any position-dependent signal) to be multiplied by an exciter signal. A demodulator is a phase sensitive rectifier for the modulated signal, which may extend the linear measuring angle (or other positional range) up to twice of the amount without the demodulator. A demodulator may be a module with trimmable resistors and LC oscillator with their connections. An electronic module component, such as a demodulator, could be tested independent of the coil-body, provided a proper signal is fed into it.

Ratio-metric sensing relates to forming a ratio between a receiver signal (or any position-sensitive signal derived from it and sensitive to the part position) and a reference signal, so as to remove the effect of common mode factors. The demodulated signal is formed in such a way that the output of the signal much less dependent of the carrier voltage (exciter coil voltage). In this context, a reference signal is a signal that is substantially independent of part position along the desired measurement direction. It may be obtained from a separate reference coil, or from combining signals from sections of a receiver coil, or otherwise obtained. Electronic circuitry can be used to obtain d.c. (non-alternating) position-dependent and position-independent signals. A ratiometric signal may be formed by analog or digital circuitry, or some combination thereof (such as an analog divider and a digital memory for storing calibration data).

FIG. 1A represents a ratiometric configuration, while FIG. 1B illustrates a differential connection for a receiver coil 18 formed of two sections 12 and 14. The figures show a coil assembly generally at 20, comprising an exciter coil 10 and the receiver coil 18 having sections 12 and 14. A moveable coupler element is shown at 16, having a position correlated with a position of a part of interest.

In various examples of the present invention, a receiver coil may be tapped, for example center tapped, giving two coil sections each side of the tap. The two coil sections may have opposite winding directions, so as to generate opposed potentials within the receiver coil under excitation by magnetic flux from the exciter coil. A position-sensitive signal, such as $V_3$ in FIG. 1B, is then obtained from the receiver coil which is sensitive to the position of a coupler element, such as indicated at 16. Further, a signal substantially independent of position of the coupler element can be formed from the sum of the magnitudes of the signals from the coil sections, in this example $V_1$ and $V_2$ in FIG. 1A.

The two receiver coil sections 12 and 14 have opposite winding senses, giving first and second voltages ($V_1$ and $V_2$ in FIG. 1A) respectively relative to a center tap. The difference between these two voltages is related to the relative flux coupling between the exciter coil 10 and the receiver coil. The flux coupling may be spatially modulated using the coupler element 16, so that the difference between the two voltages is correlated with the coupler position. For example, in a rotational sensor, the coupler element may rotate. In a linear sensor, the coupler element may translate linearly. In some examples, coupler element movement may include both rotational and linear components. In FIG. 1A, the relative magnitude of the two signals may be determined. In FIG. 1B, the output voltage $V_3$ is the receiver signal, sometimes termed a differential signal voltage from the receiver coil, which is modulated by the coupler element effect on flux coupling so as to be correlated with the coupler element position.

FIG. 2 shows reference and receiver signal generation using a receiver coil having a center tap. The receiver coil has first and second sections, labeled 30 and 32 respectively. These sections may be substantially coplanar on a substrate, for example fabricated in the manner of a printed circuit board. As illustrated, the inner and outer coil peripheries are polygonal, but in other examples the coil sections may comprise radial and circular arcuate sections.

When two opposite-wound coils are exposed to the magnetic flux from an exciter coil, two opposite voltages with respect to the ground are induced and they act as voltage sources. The sum of the opposite voltages may be termed a differential voltage, as it is the difference between the two opposed induced voltages. This differential signal is correlated with the angular position of a coupler element, and in a rotational sensor may be termed a rotational modulator (RM) signal. Further, the sum of the magnitudes of the opposed voltages may be used to generate a reference signal, also referred to herein as a common mode voltage or AM (axial modulator) signal.

A reference signal can be generated so as to be substantially independent of the rotational position of a coupler element, while sensitive to the axial separation of a coil assembly and coupler element and other common mode factors such as exciter signal voltage. A common mode signal influences both position sensitive and position insensitive signals, allowing elimination of such common mode effects by forming a ratiometric signal. The reference signal may be generated by a separate reference coil, from signals from sections of a receiver coil, or by other methods such as described herein. A receiver coil may also be referred to as a rotational modulator coil, or RM coil, when used in a rotational sensor. However, even when the terminology RM is used in examples below, the inventive concepts are not limited to rotational sensors but may also be used in linear sensors.

A reference signal (common mode signal) can be generated from a receiver coil with center tap as shown in FIG. 2. If the two coil sections 30 and 32 are wound in opposite directions relative to each other (e.g. clockwise and anticlockwise), then the induced signals in each section are opposite polarity with respect to the ground, and may be denoted $RM^+$ and $RM^-$. These are analogous to $V_1$ and $V_2$ shown in FIG. 1A. The signal RM is the receiver signal, and is correlated with the part position. Each signal may be an alternating signal, but at any particular time induced voltages may be opposed. Position information can be determined from a differential signal (which is zero if the two opposed signals have the same magnitude), while a reference signal is given by the summation of the magnitude of two signals.

FIG. 3 shows an electronic circuit for obtaining a reference signal and receiver signal. A coil assembly comprises exciter coil 10 and a receiver coil having first and second sections labeled 12 and 14 respectively, as discussed above in relation to FIGS. 1 A and 1B. A first amplifier 40 generates a signal correlated with part position. The second amplifier 42 generates a signal generally independent of part position of interest, but correlated with the common mode factors. The outputs are RM (receiver signal) and AM (reference signal) at 44 and 46 respectively. The signals from the receiver coil are labeled $RM^+$ and $RM^-$, indicating opposed signals from the two receiver coil sections.

Receiver coil section signals may be denoted $RM^+$, $RM^-$, though the invention is not limited to rotational position sensors. The differential signal (the receiver signal) has a correlation with position over a positional range. The differential signal is the resulting signal after combination of $RM^+$ and $RM^-$, which tend to oppose each other. The positional signal is not uniquely defined versus angle over a wide angular range. However, in a multi-turn sensor, a reference signal may be used to determine the angular range (for example, the number of rotations in a multi-turn sensor), and hence an apparatus may determine the angle uniquely over a wide positional range.

Reference Signal Magnitude and Gap

In order to obtain a reference signal to be inversely proportional to the gap, the a position-independent signal may be subtracted from a baseline voltage, for example a baseline voltage derived from the exciter signal voltage, or a portion thereof. For example, a voltage divider can be used to obtain a predetermined fraction of the exciter voltage, and a first reference signal subtracted from it to obtain an improved second reference signal that is substantially independent of part position. The term reference signal is used herein generally to describe a signal being substantially independent of part position, and in some examples of the present invention signal a first position independent signal (which may be useful as a reference signal) is subtracted from a baseline voltage to obtain a second reference signal having a desired relationship with an environmental variable such as the common mode factors.

An example approach is now described. Using a voltage divider formed from a capacitor pair (or resistor pair) as shown in FIG. 4, the exciter signal voltage is reduced to a value CRr, where $CRr=CR/2 \times C_1/(C_1+C_2)$. This value can be engineered to satisfy the equation $CRr=RM^+_{max}+RM^-_{max}$, then the reference signal voltage (here denoted AM) can be engineered to satisfy the equation:

$$AM=CRr-(RM^+_x+RM^-_x) \qquad (1)$$

where:

$RM^+_{max}$ means induced voltage of forward RM coil when the coupler covers completely the Backward RM coil with zero gap, at a coupler position (such as a rotor position) that creates maximum magnetic flux;

$RM^-_{max}$ refers to the induced voltage of the backward RM coil section when the coupler covers completely the forward RM coil with zero gap at the degree of temperature that creates maximum magnetic flux. Example of the implementation are discussed below that can create a AM signal having desired properties; and CRr is a baseline voltage derived from the exciter signal.

However, the invention is not limited to any particular derivation of the baseline voltage. For example, a baseline voltage may be obtained using the exciter signal, other oscillator or circuit preferably on the same power supply, the power supply level, stored memory location defining a baseline voltage, or other source.

FIG. 4 shows a voltage divider allowing the baseline voltage CRr signal to be engineered to match the sum of absolute values of two opposed RM coil sections at their maximums. This CRr signal, obtained at output 64 within a capacitive bridge across a section of the exciter coil 60, can be obtained either by the capacitive division as shown, or by resistive division using a pair of resistors. In this example, CRr is obtained by voltage collection, and the center tap 62 is connected to ground.

Figure 5:
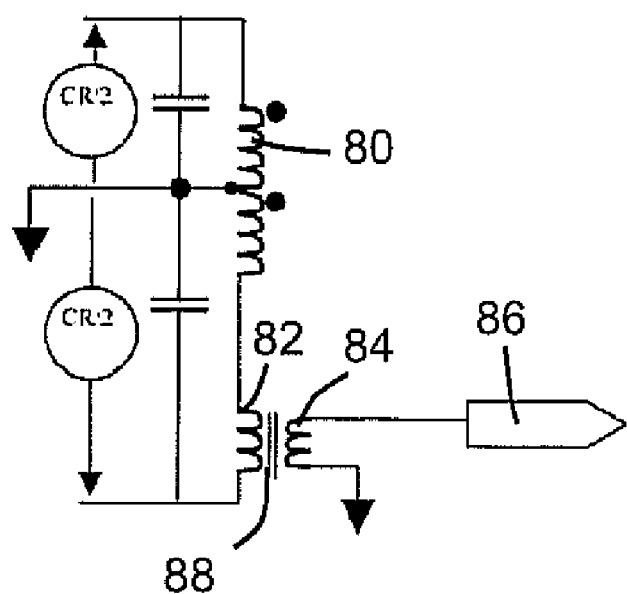
FIG. 5 shows a baseline voltage obtained from the exciter signal using current collection.

FIG. 5 shows generation of a CRr signal using current collection. This example uses an exciter coil 80 and a CRr generator using secondary exciter coil 82 and supplemental reference signal coil 84. In this example, the combination of coils 82 and 84 is provided by an isolation transformer Here, the CRr signal is obtained from output 86 of the isolation transformer secondary winding, the primary winding being the secondary exciter coil.

In further examples, the supplemental reference coil 80 is located so as to be proximate to the exciter coil 80, and energized by flux from the exciter coil 80, so that the secondary exciter coil 82 is omitted.

Figure 6A:
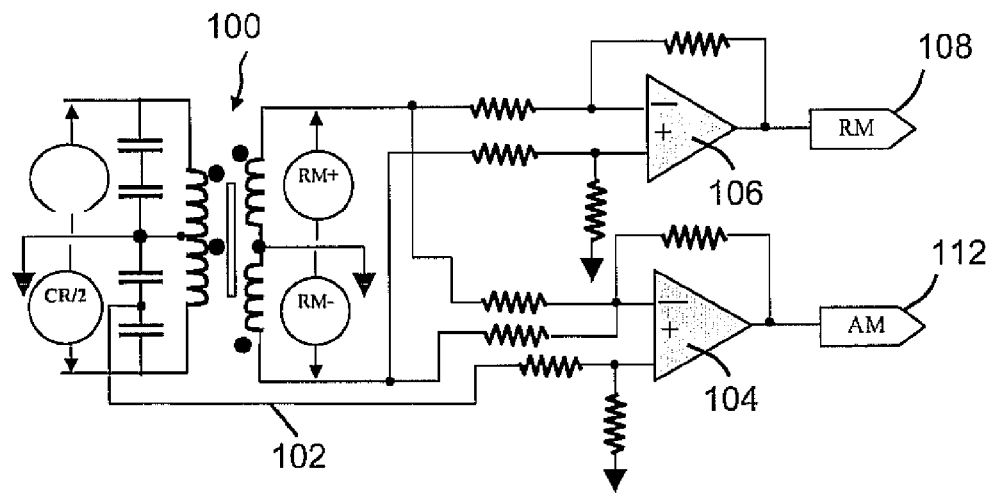
FIGS. 6A and 6B show gap corrected reference signals obtained by subtracting a position-independent signal from a baseline voltage, the baseline voltage being obtained using a capacitive bridge in FIG. 6A and current collection in FIG. 6B.

FIG. 6A shows gap corrected reference signal (AM) generation using the baseline voltage denoted CRr. This is a voltage coupling circuit, which is not theoretically exact but in practice may be used when the exciter coil (CR) inductance is approximately constant. The term CRr may represent a baseline voltage derived from the exciter signal. Rectification or other signal processing can be used to obtain d.c. baseline voltage levels if desired.

The coil assembly shown generally at 100 includes an exciter coil and a receiver coil, and is similar to the configuration shown in FIG. 1. Hence, exciter coil 10 and receiver coil sections 12 and 14 may be used, as described more fully in relation to FIG. 1. A CRr signal is obtained by capacitive bridging of a section of a section of the exciter coil, as shown in FIG. 4. The amplifier 106 is used to obtain a subtraction of the differential signal from the CRr signal, so as to obtain an improved reference signal 110. Operational amplifier 104 is used to give a receiver signal (RM signal) at 108, as described in relation to FIG. 3. The output 108 may be the same as output 44 in FIG. 3, but the reference signal (AM) has been subtracted from the CRr signal.

Figure 6B:
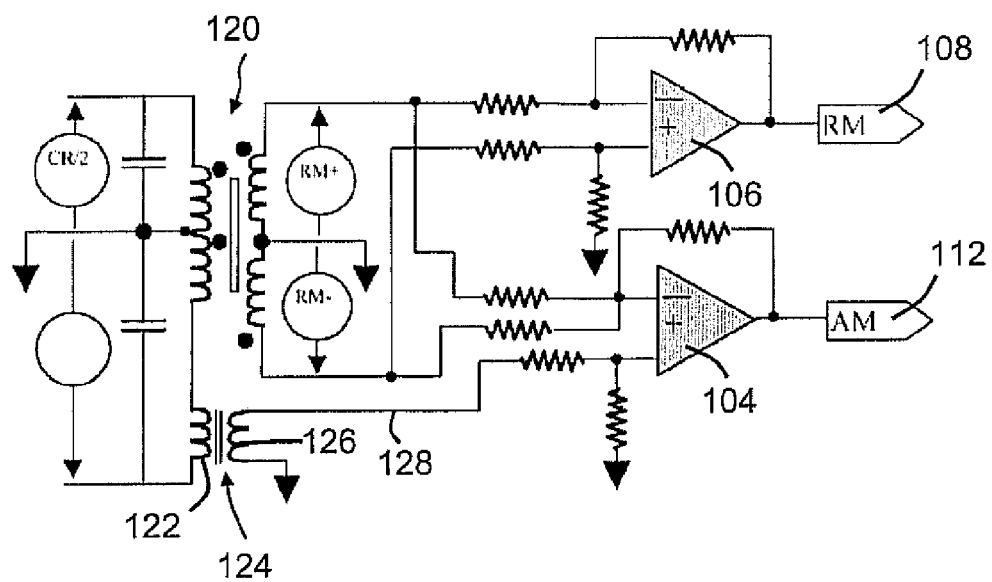

FIG. 6B shows a current coupling circuit using an isolation transformer. The CRr induced voltage remains in phase with CR and remains a good voltage source, with low impedance to the amplifier.

The reference signal obtained using the circuits of FIGS. 6A and 6B (at outputs 110 and 112 respectively) may be termed gap-corrected reference signals, as by appropriate selection of the baseline voltage a gap-corrected reference signal becomes larger as the gap between a coil assembly including the receiver coils and the coupler element decreases. This is the same trend as the receiver signal (in this case, the signal at 108), follows. Hence, the gap corrected reference signal can be used to correct for gap variations.

In this example, the coil assembly includes an exciter coil and receiver coils which may be the same as shown in FIG. 1A, and in addition a CRr signal is generated using current collection. This example uses CRr generation using a secondary exciter coil 122 and supplemental reference signal coil 126, for example as discussed above in relation to FIG. 5, for example in the form of an isolation transformer that is separate from the exciter coil inductively coupled to the receiver coils. The CRr signal is obtained from output 128, and is used by the amplifier 106 to generate reference signal for correction of common mode factors.

In further examples, the secondary exciter coil is omitted, for example by eliminating the use of an isolation transformer, and the supplemental reference coil is located proximate to the exciter coil, so as to be energized by flux from the exciter coil.

Ratiometric Coil Design

Figure 7:
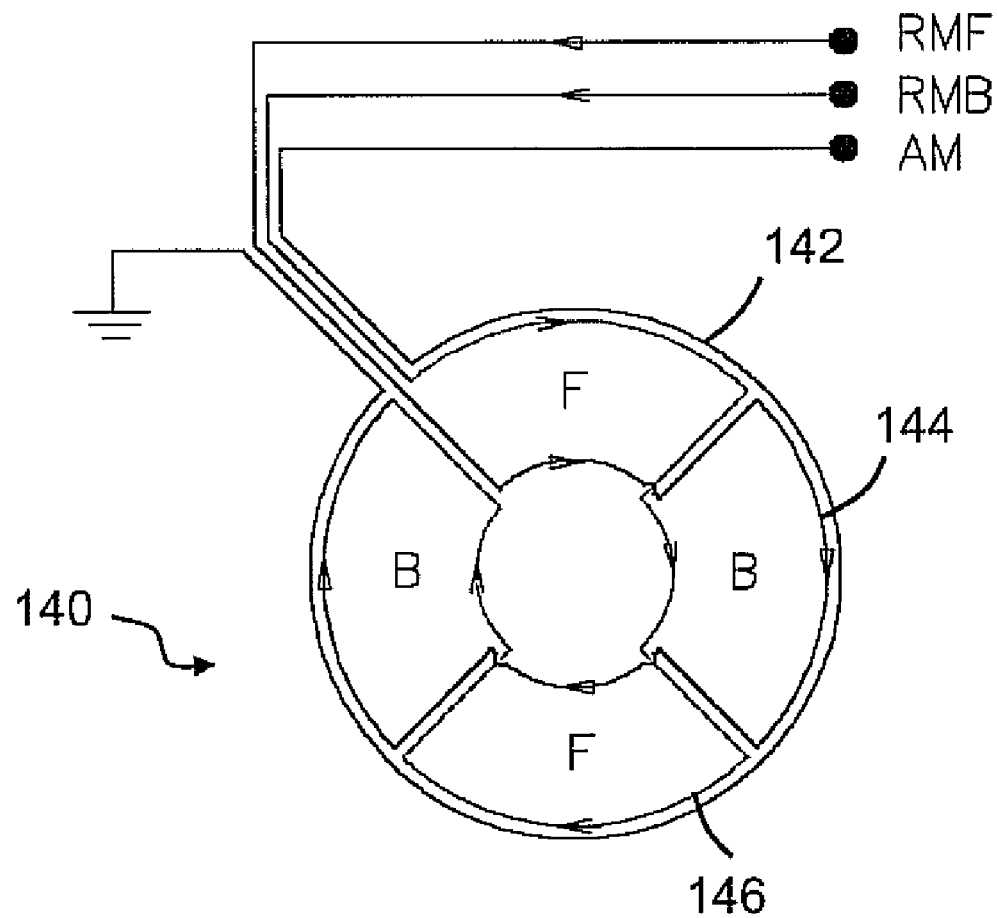
FIG. 7 shows a two pole coil receiver design for a rotational sensor, and an optional loop (non-differential structure) reference coil.

FIG. 7 shows generally at 140 a two pole coil design to provide a receiver signal (RM, rotational modulator signal) and a reference signal (AM, axial modulator signal) for an improved rotation sensor.

In this example, the reference coil is a single loop 142, and a receiver coil comprises a differential structure. The circumferential arrows indicate the relative directions of induced potentials (which alternate with time), so that the receiver signal output is the sum of opposed potentials in oppositely wound portions. For example, the induced potentials in adjacent outer arcuate portions 144 and 146 tend to oppose in the resultant receiver signal obtained from outputs RMF and RMB. Similarly, signals in adjacent inner arcuate portions are opposed.

A coil assembly may further comprise an exciter coil, which may be generally circular and with a radius similar to the reference coil (also for example, similar to the outer radius of the receiver coil).

In some examples, the amplitude of the position independent signal from the non-differential reference coil may be subtracted from a baseline level.

Figure 8:
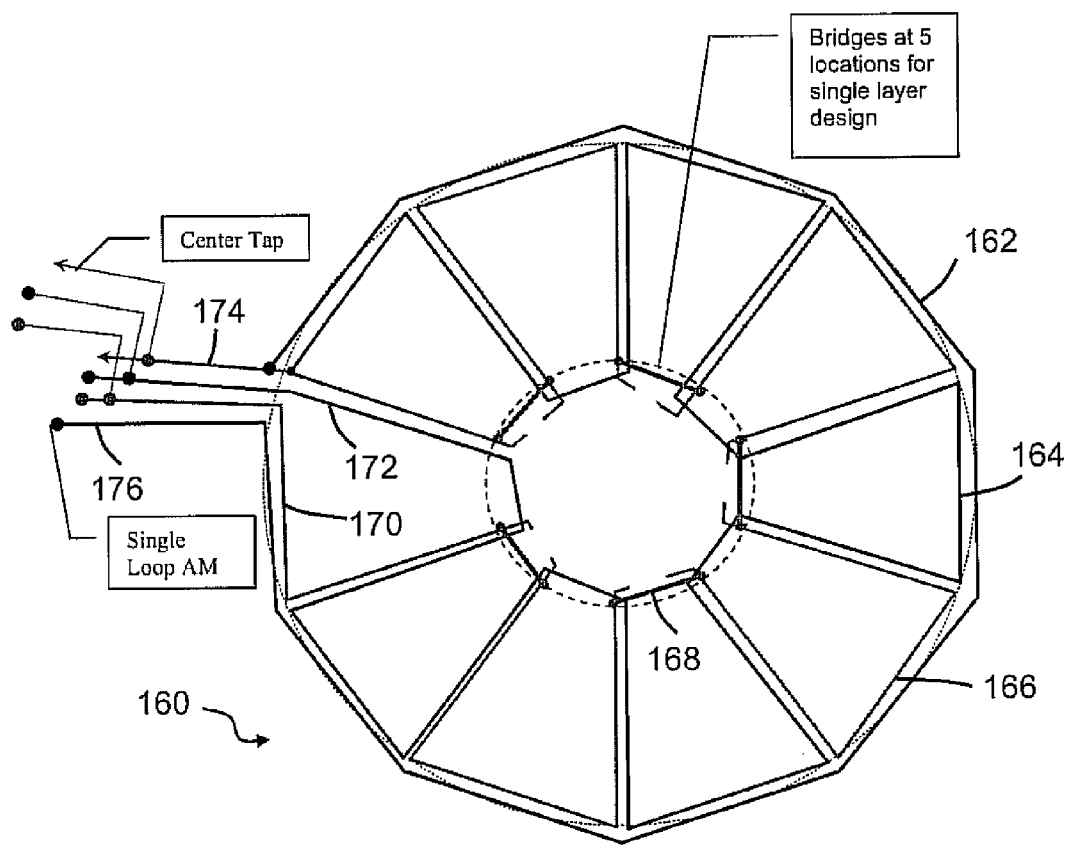
FIG. 8 shows a 5 pole receiver coil design and reference coil, which may alternatively be configured to have a generally circular inner and outer periphery.

FIG. 8 shows a 5 pole receiver coil design generally at 160, with an outer reference coil 162 and a receiver coil having a differential structure. Adjacent substantially circumferential portions of the reference coil contribute opposed potentials to the receiver signal. In this example, the coils are polygonic coils, which facilitates fabrication in some examples (such as assembly using metal rods on a framework), and also facilitates illustration. In other examples the coils may instead be arcuate (or circular wedge shapes). In this example, the RM coil pair is differential around ground, while AM coil (single loop reference coil 162) is not differential, but it can be made effectively differential using an electronic circuit. For example, the reference signal can be subtracted from a baseline value, such as the CRr signal provided by other examples.

The reference (AM) signal is provided at output 168, and the receiver signals are provided at outputs 170 and 172, with output 174 providing a center tap to the receiver coil.

A coil assembly may further comprise an exciter coil, which may be generally polygonic or circular and with a radius (or equivalent dimension, such as mean center to periphery distance) similar to the radius or equivalent dimension of the reference or receiver coils.

Figure 9A:
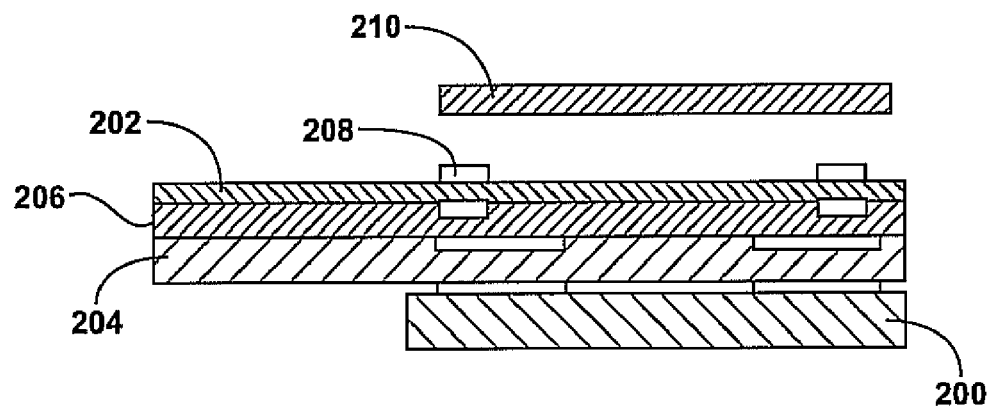
FIG. 9A shows a ferro-magnetic metallic plate positioned so as to increase signal strength from reference (if used) and/or receiver coils.

FIG. 9A shows a ferro-metallic plate 200 positioned so as to amplify the signal strength from receiver and reference coils, allowing a reduced size sensor. The ferromagnetic plate (ferro plate) is supported on the opposite side of a coil assembly structure from the coupler element 210. In this example the coupler element is a rotor, though this approach is advantageous also for linear sensors. The coil assembly comprises reference coil (AM, in this example a single loop) 208 on substrate 202 (for example, a circuit board), with other substrates 206 and 204 optionally provided to support other components. The ferromagnetic plate acts as a signal amplifier plate, and may comprise any ferromagnetic material (including ferrite at high frequencies), or other material capable of increasing inductive coupling.

Figure 9B:
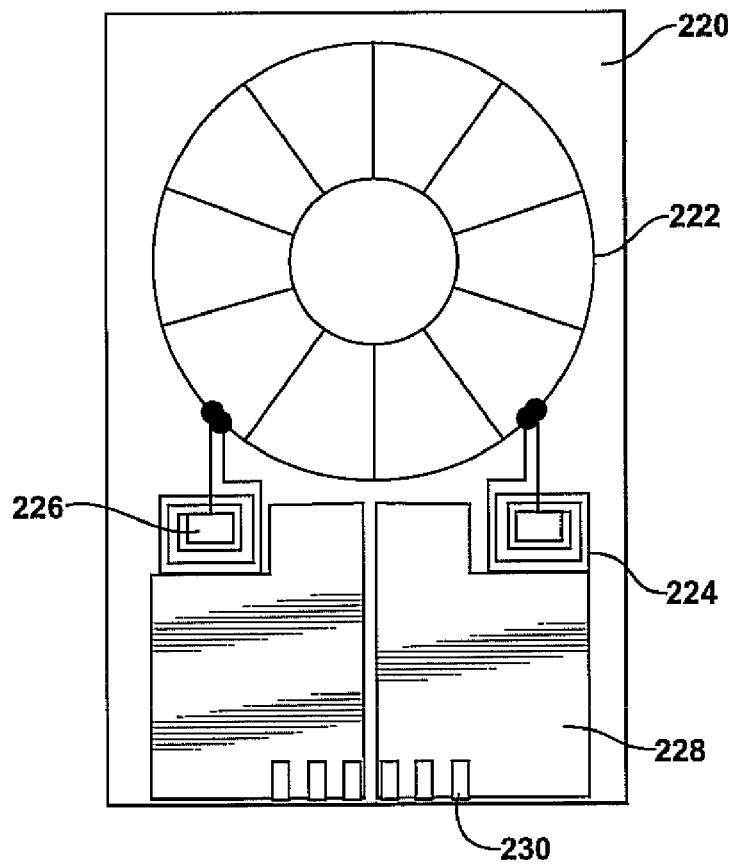
FIG. 9B shows the use of additional coil structures using a ferromagnetic core.

FIG. 9B shows the inductor core as ferro (e.g. ferromagnetic steel) or ferrite material inserted into the supporting substrate, which may be a circuit board such as a printed wiring board. At high exciter coil frequencies, such as 1 MHz and above, a ferrite material may behave as a ferromagnetic material, allowing the sensor size to be reduced. Also, inductance is increased so as to be more independent of the temperature influence on the CR (exciter) coil.

FIG. 9B generally illustrates the position of components on a substrate 220. A coil assembly illustrated in simplified fashion at 222 comprises a receiver coil (not shown in detail) and a single loop reference coil (also illustrated in simplified fashion) around the outer periphery. To obtain an enhanced reference signal, additional coil structures such as 224 are connected into a series arrangement into the reference coil by tapping into the loop. The additional coil structures have a ferromagnetic core, such a ferromagnetic disk or plate supported on the substrate, so as to increase the reference signal. Electronic circuitry may be supported by the same substrate (which may be a printed circuit board) at locations such as 228. Outputs are provided at the edge of the substrate at 230, for example allowing the assembly to be inserted into a receiving slot.

In some examples, the additional coil structures may be used as a source of baseline voltage. In some examples, a similar approach using additional coil structures having a ferromagnetic core may also be used to enhance the inductance of receiver coils. An air core can be used if the obtained CRr is sufficient.

Electronic Circuit and Signal Conditioning

Figure 10A:
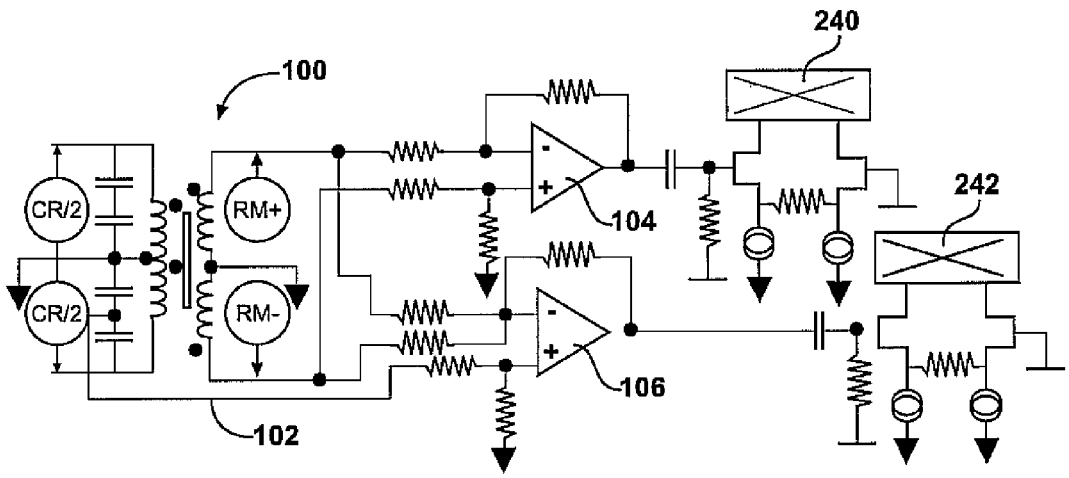
FIG. 10A shows an apparatus having a coil assembly and associated electronic circuit, using a baseline voltage to modify the reference signal.

FIG. 10A shows an apparatus comprising a coil assembly generally at 100, in this example as shown above in FIG. 6A, with CRr signal obtained from a capacitive bridge at 102, again as discussed above in relation to FIG. 6A. The output of amplifiers 104 and 106 of the configuration of FIG. 6A are here passed to Gilbert Cell rectifiers 240 and 242, used as differential amplifiers. Before entering the Gilbert Cell circuit, AC (capacitive) couplings are used to isolate the Gilbert cell circuit the virtual ground level and the voltage level is adjusted to one suitable to the Gilbert Cell. In other examples, operational amplifiers or other circuitry may be used instead of Gilbert cells. The electronic circuit may be implemented, in part or in whole, as an ASIC.

Figure 10B:
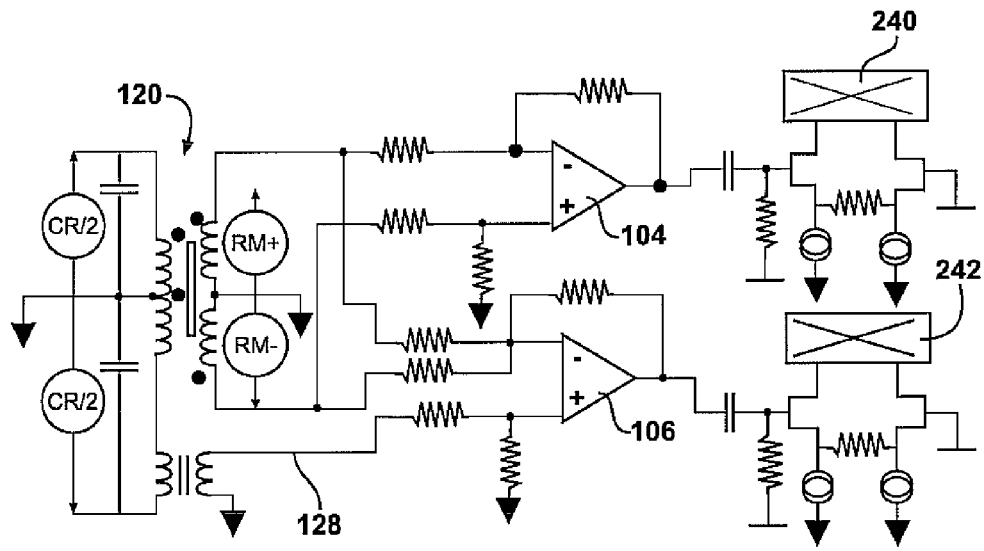
FIG. 10B shows a circuit similar to FIG. 10A, using a current collection approach to generating the baseline voltage.

FIG. 10B shows a current coupling version of the circuit of FIG. 10A, using a coil assembly shown generally at 120 with use of an isolation transformer to provide a CRr signal at 128 as discussed in relation to FIG. 6B. Other aspects are similar to the circuit of FIG. 10A.

Further Electronic Circuit Configuration

For various examples discussed, zener zapping or other programmable logic circuit can be used to modify voltage levels, such as virtual ground levels, and control signal levels. Other forms of static memory may be used. In representative examples used as an electronic throttle control of an automobile, the input signal may be 20 mV in its maximum at the maximum ratio of one. The magnitudes of maximum RM and the maximum AM signals can be the same.

Figure 11A:
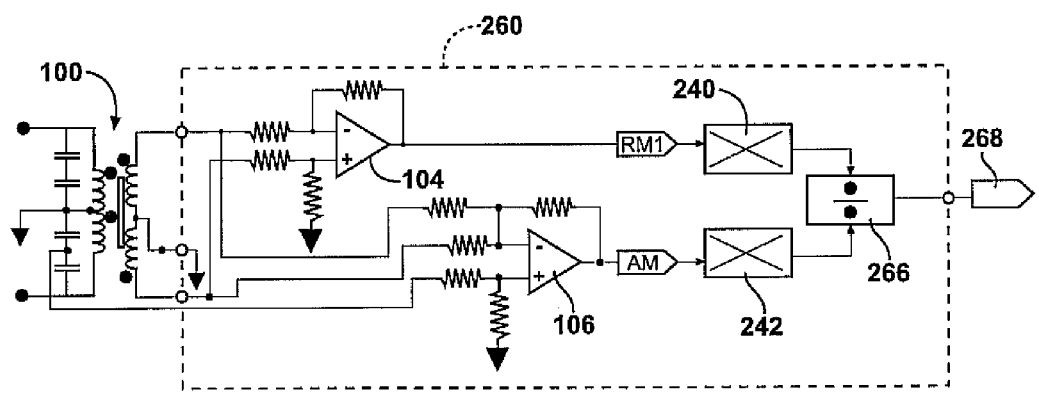
FIGS. 11A and 11B show further example schematics of electronic circuits that generate a ratiometric signal.

FIG. 11A shows a further example schematic of an electronic circuit, in which the electronic circuit is controlled within a unit 260. The apparatus also includes coil assembly 100, amplifiers 104 and 106, and Gilbert cell circuits 240 and 242 as discussed in more detail elsewhere in this specification, which will not be repeated here for conciseness. Here, the representation of the Gilbert cell circuits includes auxiliary components. In this example, the outputs of the Gilbert cell circuits 240 and 242 are passed to a ratiometric circuit, such as an analog divider. (A digital divider may also be used).

In this example, the default configuration may be a deactivated logic condition, in which a logic-driven selectable switch always connects the RM1 signal. In this way it, an ETC (electronic throttle control) function can be obtained using the output at 268, in which common mode factors have been substantially eliminated.

Figure 11B:
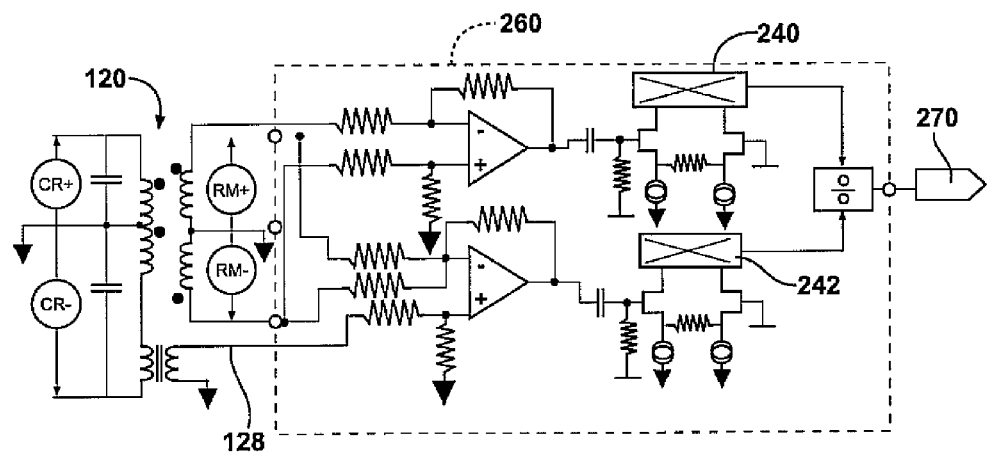

FIG. 11B shows another version of the circuit of FIG. 11A, using an isolation transformer to provide the CRr signal at 128, which has been discussed in more detail above in relation to FIGS. 5B and 6B. The ratiometric output at 270 can be used in ETC (electronic throttle control) applications.

Figure 12A:
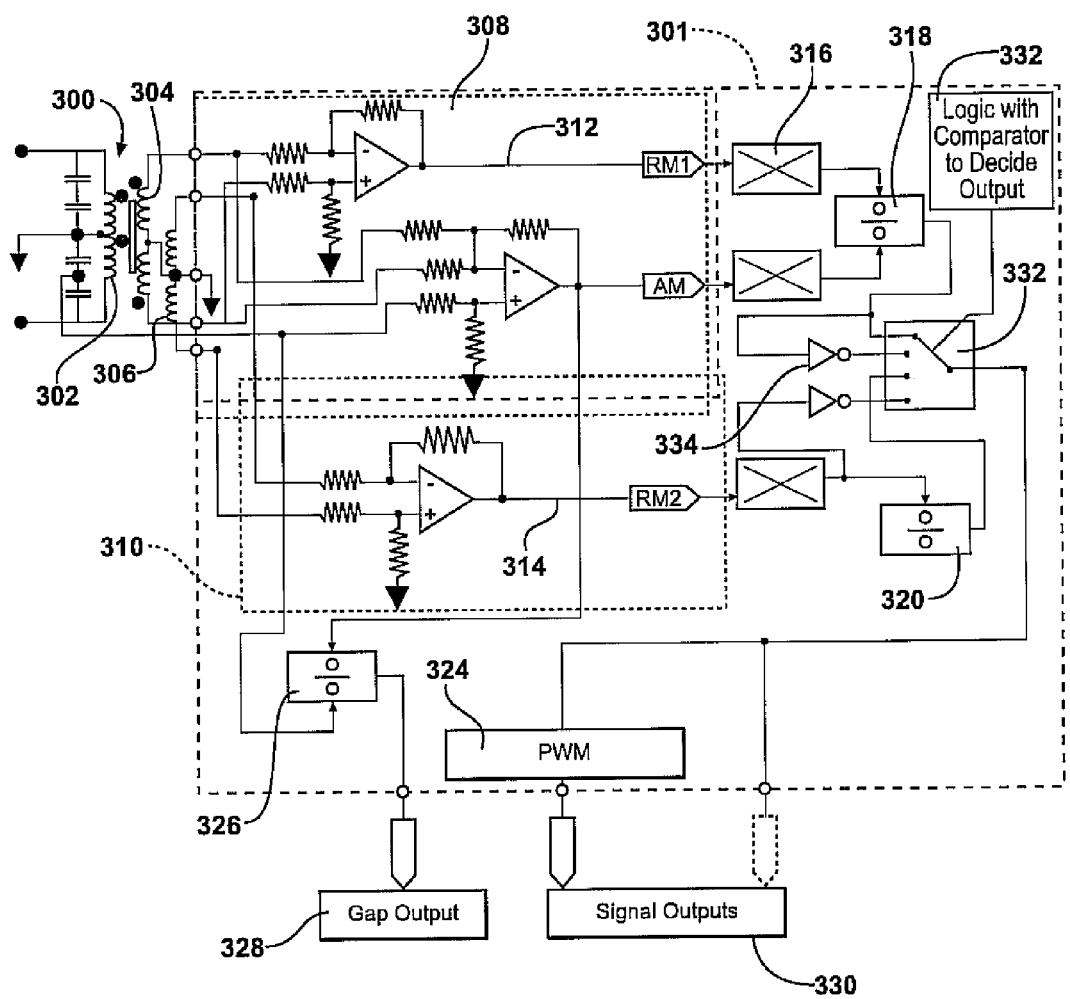
FIGS. 12A and 12B show apparatus each having a plurality of receiver coils, in these examples two receiver coils.

FIG. 12A shows an extended configuration, which may be used for extended angular range applications, including multi-turn sensors. The coil assembly shown generally at 300 includes an exciter coil 302 and a pair of receiver coils 304 and 306, having a relative phase offset between them. Two receiver signals are obtained, labeled RM1 and RM2, allowing a linear response to be obtained over a wide angular range.

An electronic circuit is shown at 301. The circuit portion at 308 is similar to that discussed in relation to FIG. 6A, and provides a first receiver signal RM1 at 312. A second RM generating circuit is provided at 310, associated with the second receiver coil, to generate RM2 at 314. Only one AM signal is generated here, as discussed above in relation to FIG. 6A. The signals RM1 and RM2, along with the reference signal AM, pass through Gilbert cell circuits such as 316 to divider circuit 318 (RM1 and AM) and 320 (RM2 and AM). A logic driven switch 332, coupled to comparator 322, is operational in order to span one modulus (range of unique angle-dependent signals) in a saw-tooth signal form. The switch selects ratiometric signals obtained using RM1, inverted signal using RM1, RM2, or inverted signal using RM2, and the selected signal is output at 330 either directly or as pulse width modulation. This approach can be used to obtain additional RM signals from additional receiver coils.

In this mode, the signal conditioner can identify a unique position within one modulus, which here comprises 4 linear signal segments, through logic operation. The logic circuit may determine the correct angular range using a stack counter, and provide an offset value to add to the output signal obtain a linear response over a wide angular range. In the case of a rotational sensor, the phase offset between the receiver coils can be related to 360 degrees divided by twice the number of poles for each coil, e.g. 90 degrees for a pair of two-pole coils.

The PWM frequency, determined by PWM 324, may be selectable via outside passive element trimming, or internal passive element with zener zap setting or other static logic. The frequency range can be, for example, from 100 Hz to 1 KHz. This extended configuration can be directly used in a steering combined sensor (e.g. a combined torque and steering angle sensor) due to the gap ratiometric measuring feature.

Divider circuit 326 is used to provide a gap output at 328, by forming a ratio of the AM signal and the CRr signal. The gap output may be used to determine a modulus value, such as the number of turns in a multi-turn sensor application.

Three functions integrated around the ratiometric chip with minor selecting operational modes allow both small angle operation and large angle operation. An additional RM processing block allows one full modulus processing (such as a 360 degree range), the PWM processing, and the gap detection using the ratio of AM to CRr signals.

Figure 12B:
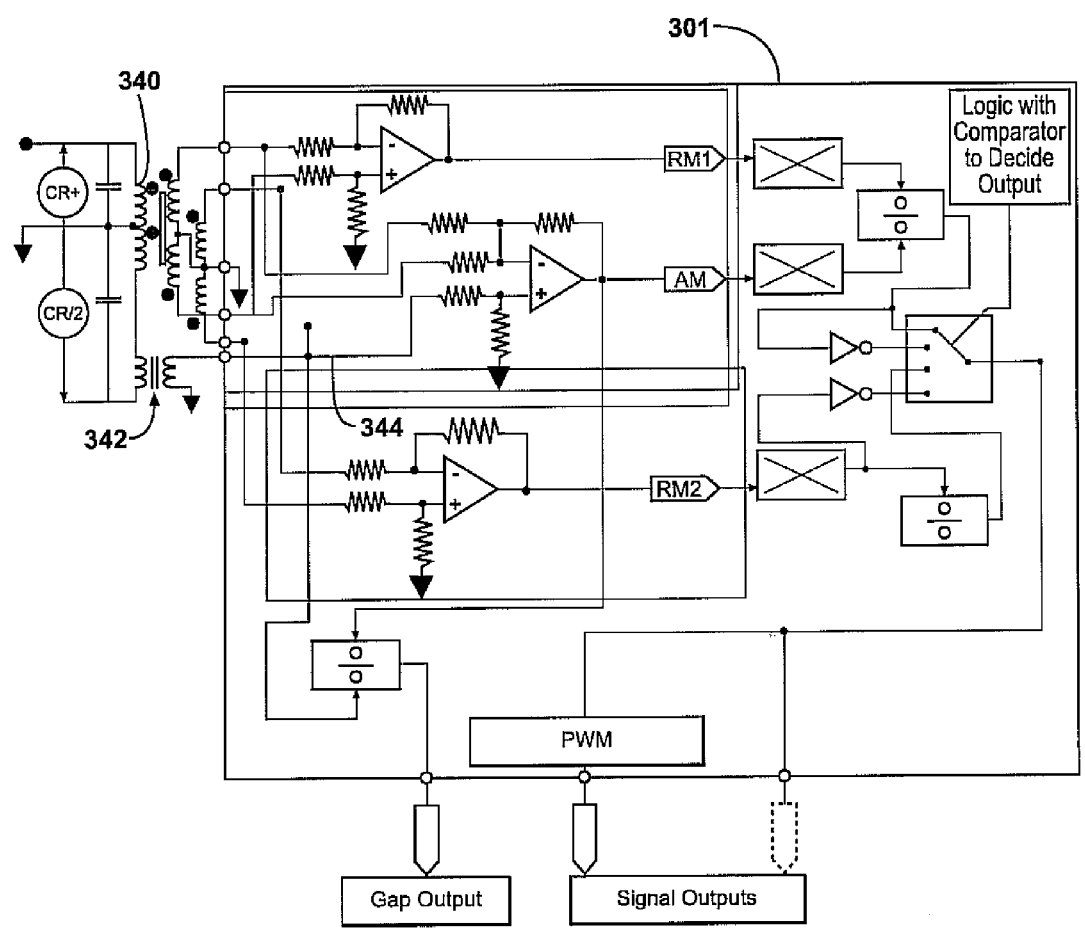

FIG. 12B shows a current coupling version of the circuit of FIG. 12A. The electronic circuit 301 is the same as in FIG. 12A, with coil assembly 340 using an isolation transformer 342 to generate the CRr signal. This configuration may be similar to that described in relation to FIGS. 5 and 6B.

Zener zapping, or other static memory or programmable logic, can be used to adjust voltage levels. Example values are five bit wide Zener zapping for manufacturing tolerance adjusting; upper plateau: 3 bits; lower plateau: 4 bits; calibration of signal along angle travel: six bits to cover ±3.2 degrees (in a rotation sensor adjustment).

Figure 13A:
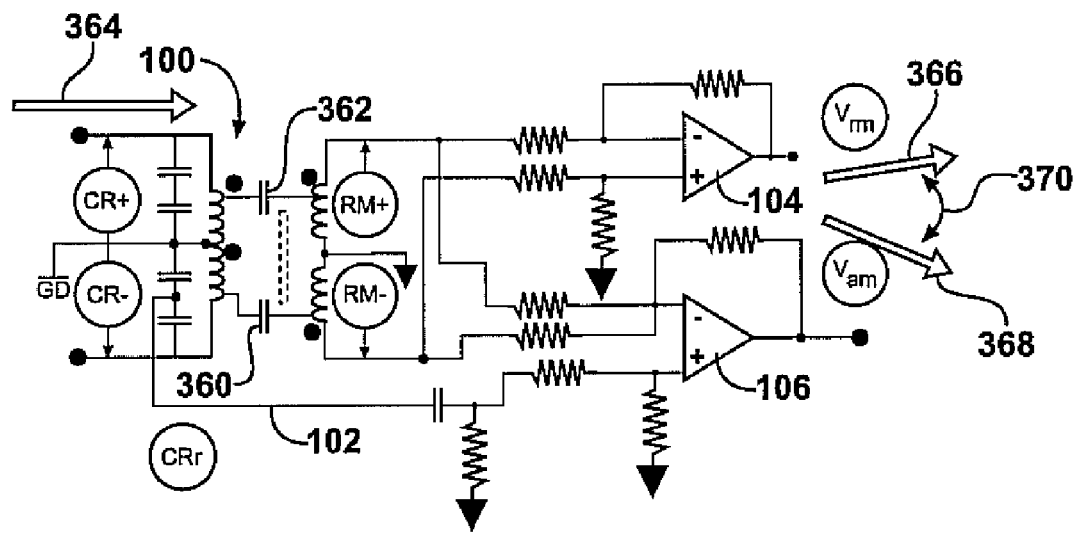
FIG. 13A illustrates the effects of capacitive coupling on output phase.

FIG. 13A illustrates the effects of capacitive coupling on output phase. In this example, the coil assembly 100 is the same as that described in FIG. 6B. The capacitors indicated at 362 and 360 are shown to represent capacitive coupling, and do not represent discrete components. The arrows 366 and 368 represent possible relative phases of the output of amplifiers 104 and 106, relative to exciter signal phase represented by arrow 364. The relative orientation of the arrows is representative of relative signal phases.

In an ideal case of infinite Q for the exciter coil (CR), no capacitive coupling between CR and RM, and with infinite slew rate for the amplifiers (operational amplifiers 104 and 106): If CR is driving the entire circuit with $V_{cr}*\sin(wt)$ and $A_{rm}$ is amplification of the first op-amp divided by that of the second op-amp, and coupling factor is assumed k, and coil winding ratio is one, then the tank current is $Qr*d(V_{cr}*\sin(\omega t))/dt = Qr*V_{cr}*\cos(\omega t)$, which is induced to the receiver coil (RM), together with consequence of Lenz law that makes the CR voltage in-phase with the induced voltage, then as follows:

$$V^s_{RM} = k(RM^+ - RM^-)*Vcr*A_{rm} \quad (2)$$

$$V^s_{am} = k*(RM^+ + RM^- - CRr)*Vcr*A_{am} \quad (3)$$

Voltage induction can also be obtained through a noise path:

$$V^n_{rm} = C*d(Vcr)/dt*R*A_{rm} = j\,wC*Vcr*Req*Arm \quad (4)$$

$$V^n_{am} = C*d(Vcr)/dt*R*A_{am} = j\,wC*Vcr*Req*A_{am} \quad (5)$$

where Req represents the RMs loop resistance. The total induced voltages are:

$$V_{rm} = V^S_{rm} + V^n_{rm} = A_{rm}[k(RM^+ - RM^-)*Vcr + j\,\omega C*V_{cr}] \quad (6)$$

$$V_{am} = V^S_{am} + V^n_{am} = A_{am}[k*(RM^+ + RM^- - CRr)*V_{cr} + j\omega C*Vcr] \quad (7)$$

The relatively large CRr voltage in the second equation above makes $V_{am}$ out of phase from $V_{rm}$. The arrows represents the resultant phase delay, shown as the angle at 370, which can be denoted Φ. This phase delay may cause signal drifting due to temperature variation, so that the phase delay should be minimized, or a phase adjusting device (or RC divider) installed after the reference signal (AM) amplifier 106.

Figure 13B:
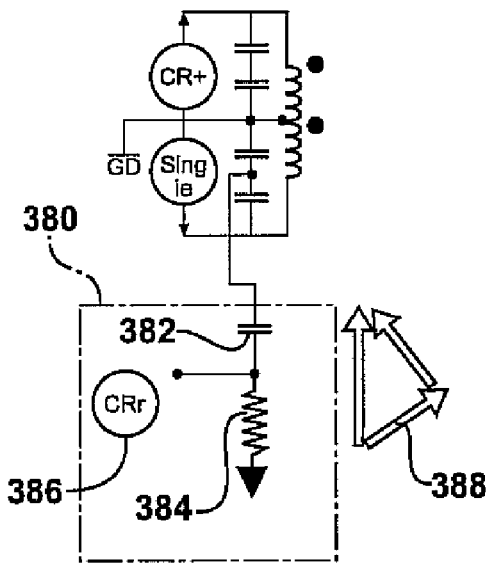
FIG. 13B shows a phase shifter circuit to reduce the effects of capacitive coupling.

FIG. 13B shows an alternative method of controlling phase using AC coupling, using phase shifter circuit 380. Using the AC coupling between the AM summing op-amp and CRr, the phase can be corrected as shown. In this case the vector combination of R+jwC is carefully chosen to align the voltage vector with $V_{rm}$. FIG. 13A shows the phase shift circuit introduced between the capacitive bridge output 102 and the amplifier 106. These components are added to the circuit shown in FIG. 6A.

The CRr' term indicates the voltage vector across the combination of impedance vectors (resistor and capacitor), as indicated using the phase diagram at 388. The CRr' term is controlled to get the desired CRr through the impedance vectors. This phase shifter circuit can be built into a silicon chip, such as an ASIC used for other circuit components.

Minimization of the phase difference between $V_{rm}$ and $V_{am}$ not only minimizes the noise but maximizes the multiplication efficiency. If $V_{rm}$ and $V_{am}$ are in phase, small drifting of the phase has virtually no effect on the noise and multiplication efficiency.

Amplitude of the CRr Signal

In an example approach, CRr is set to be the sum of the absolute values (magnitudes) of RM⁺ (signal from the forward-wound section of the receiver coil) and RM⁻ (signal from a backward-wound section of the receiver coil). The maximum RM signal refers to the forward or backward wound RM output when RT covers one of them completely.

Ideally the value of CRr is twice the value of the maximum RM, which supposed to be the one RM coil section output with a rotor (or other coupler element) covering completely the other RM coil section. The value of CRr may also be determined by taking the sum of both RM⁺ and RM⁻ with the coupler element removed, while other approach is to measure the coupler element blocking one RM completely to get a RM forward value, and repeat the measurement with the coupler element blocking the other RM, and sum both these measures.

From strict theoretical point of view, the two measurements might be different due to the influence of magnetic flux from the coupler element, and due to the effeciency of the coupler element. The maximum RM may be the same, regardless of the measuring method, and roughly twice the value of that at nominal gap.

Figure 14A:
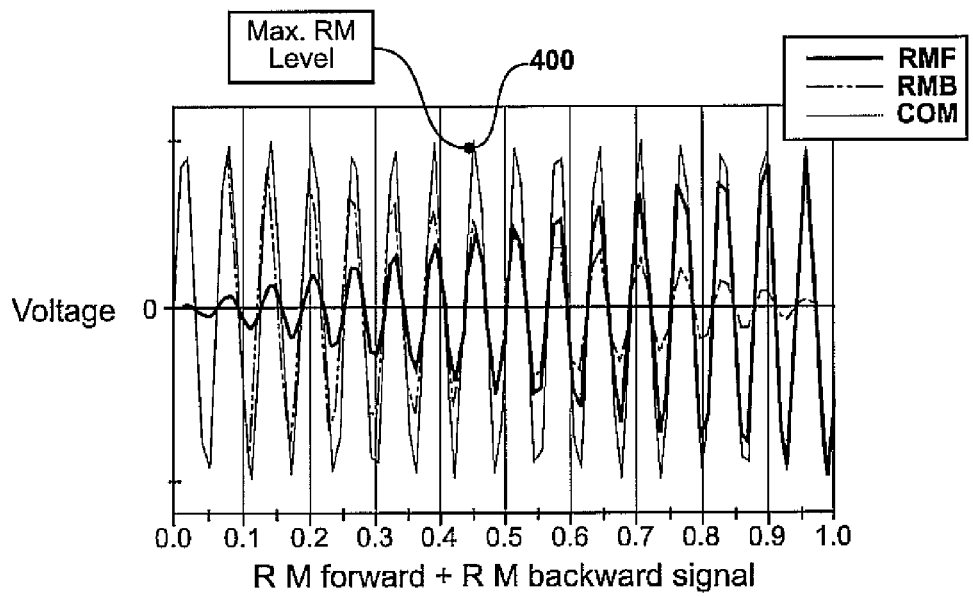
FIGS. 14A-14C show possible signals obtained from an example circuit.
Figure 14B:
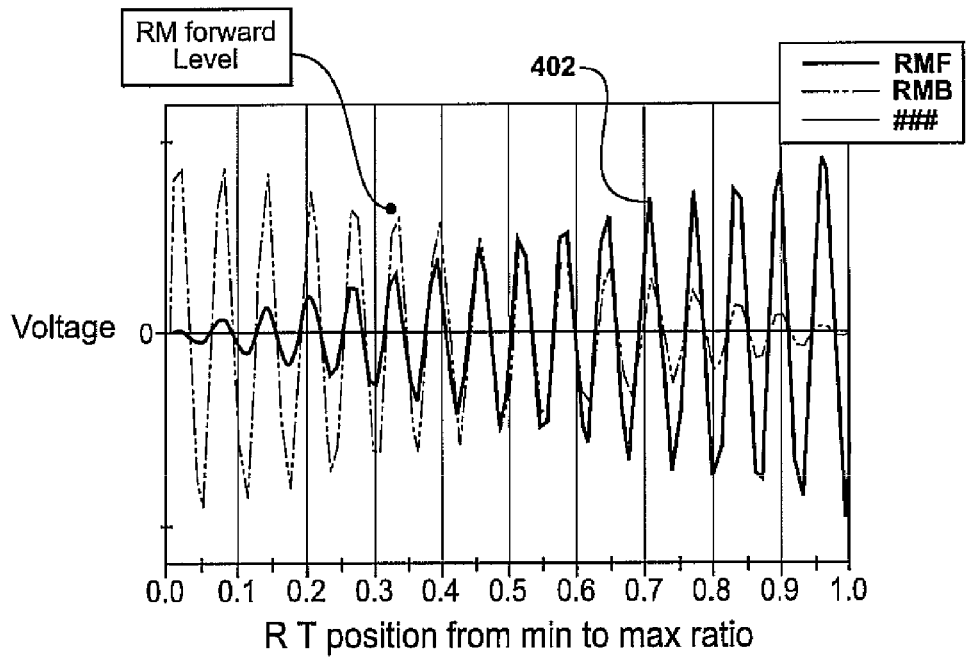
Figure 14C:
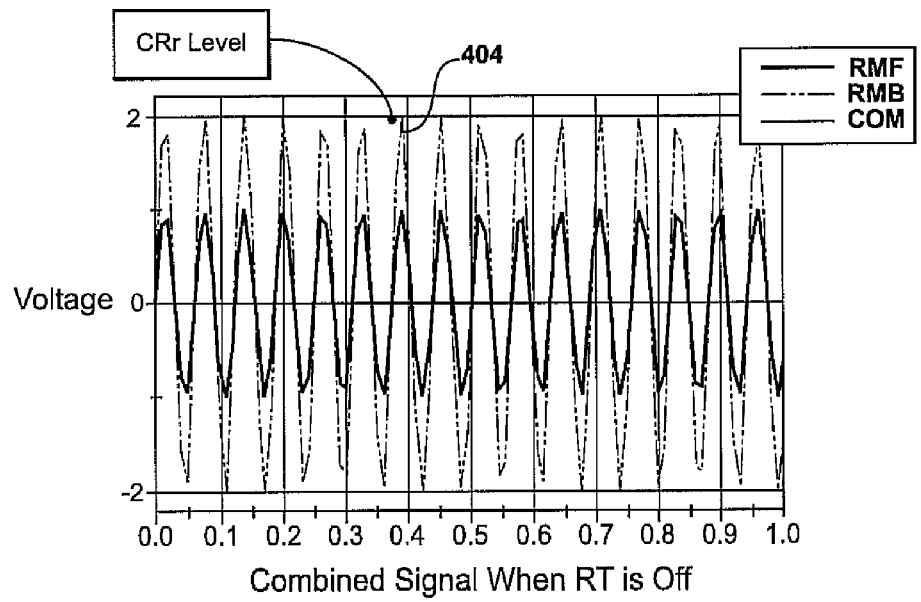

FIGS. 14A-14C show possible signals from the circuit of FIG. 3 as a function of coupler element position.

FIG. 14A shows RMF (rotational modulator forward wound section signal, also indicated as $RM^+$), RMB (backwards wound section, $RM-$) and COM, which here is the sum of $RM^+$ and $RM^-$. Here, the peak values of RM+ fall from left to right, the peak values of RM− increase from left to right, and the peak values of the sum tend to remain constant. For example, the peak 400 represents a peak value of the sum curve. The peak 400 is a peak of the combination. The signal magnitude when the coupler is removed may be the twice the magnitude of the maximum shown in FIG. 14A.

FIG. 14B shows the RM values as a function of coupler element position from maximum to minimum ratio. For example, curve 402 is the RMB signal.

FIG. 14C shows a possible value of CRr, equal to the peak at 404.

Figure 14D:
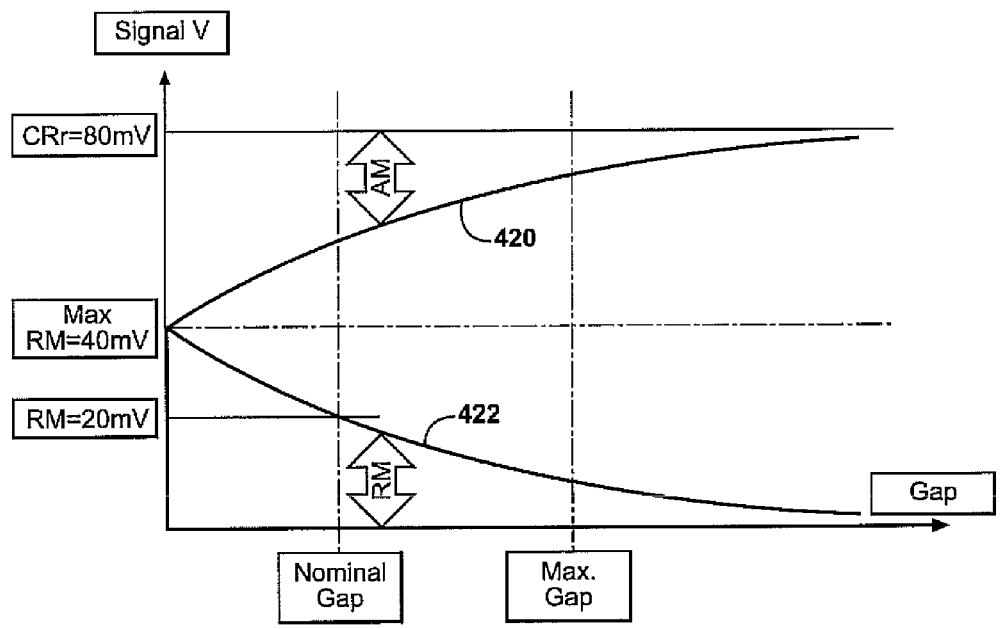
FIG. 14D illustrate how subtraction of a position independent signal from a baseline voltage improves gap correction.

FIG. 14D illustrate how AM and RM signals (420 and 422 respectively) vary with gap. In this example, the AM signal is subtracted from a constant baseline voltage, the CRr value, so that the resultant reference signal increases with decrease in gap. This improves gap correction in electronic throttle controls, and further may improve correction for other common mode factors (such as temperature) in this and other applications.

Ratio-Metric Signals and the Ratio

For two extreme cases, the effect of gap and temperature are examined as follows. If these two cases are proved to be true, then all other cases might be a combination of the two with varying degrees of those extremities.

Gap compensation proof: Assume the coupler efficiency is 100%, and the Backwards RM is completely covered by the coupler, and then the maximum common mode signal (AM at max) satisfies:

$$CR^r = \max\_RM^+ + \max\_RM^- \quad (8)$$

$$AM = CR^r - (RM^+ + RM^-) \quad (9)$$

$$AM_{atGap\_zero} = \max\_RM^+ \quad (10)$$

Consequently, the ratio=RM/AM is equal for all the gap variables.

Figure 15:
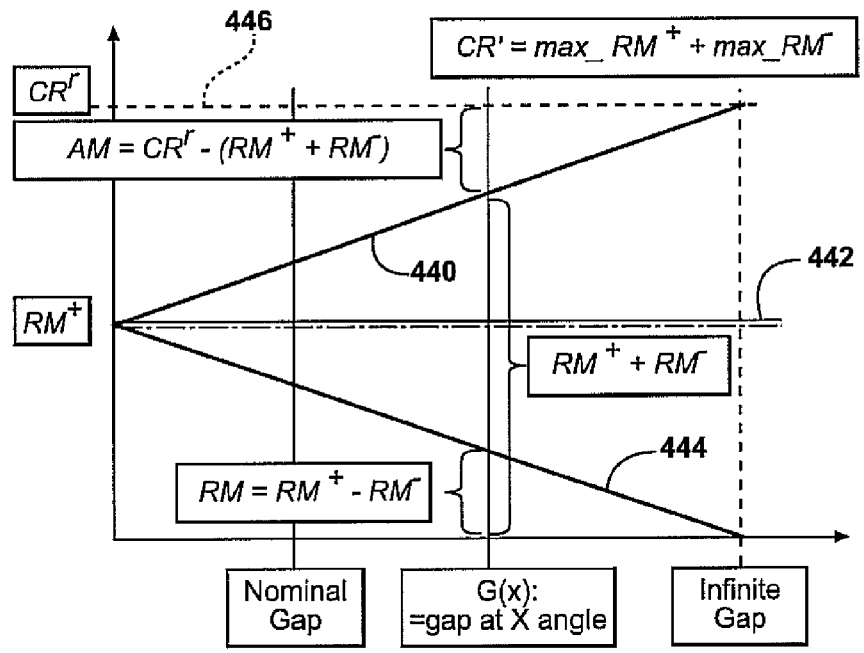
FIG. 15 illustrates improved gap correction.

FIG. 15 illustrates that the ratiometric signal RM/AM is independent of gap, after subtraction of the position independent signal from a baseline voltage, as shown as line 442. In this figure, line 440 illustrates how the AM signal varies with gap, the AM value being the value from line 440 subtracted from the constant value of CRr shown above as a dashed line 446, and also how the RM signal varies with gap as line 444. A position independent signal is a signal substantially independent of a position desired to be measured. A position independent signal is substantially independent of coupler element rotation in an rotational position sensor, but may be sensitive to gap, the axial separation of coil assembly and coupler element.

Temperature compensation proof: The coupler efficiency is assumed to be 100 percent, and the coupler covers 75 percent of the backward RM (25 percent of the forward RM is covered at the same time due to the configuration of coupler and RM coils), so that the induced voltage of the forward RM is larger. The RM starts with a gain of 50 percent, as opposed to the previous case. However, with the gap at zero and coupler efficiency at 100 percent, this recovers the same initial value of AM level as expected.

Figure 16:
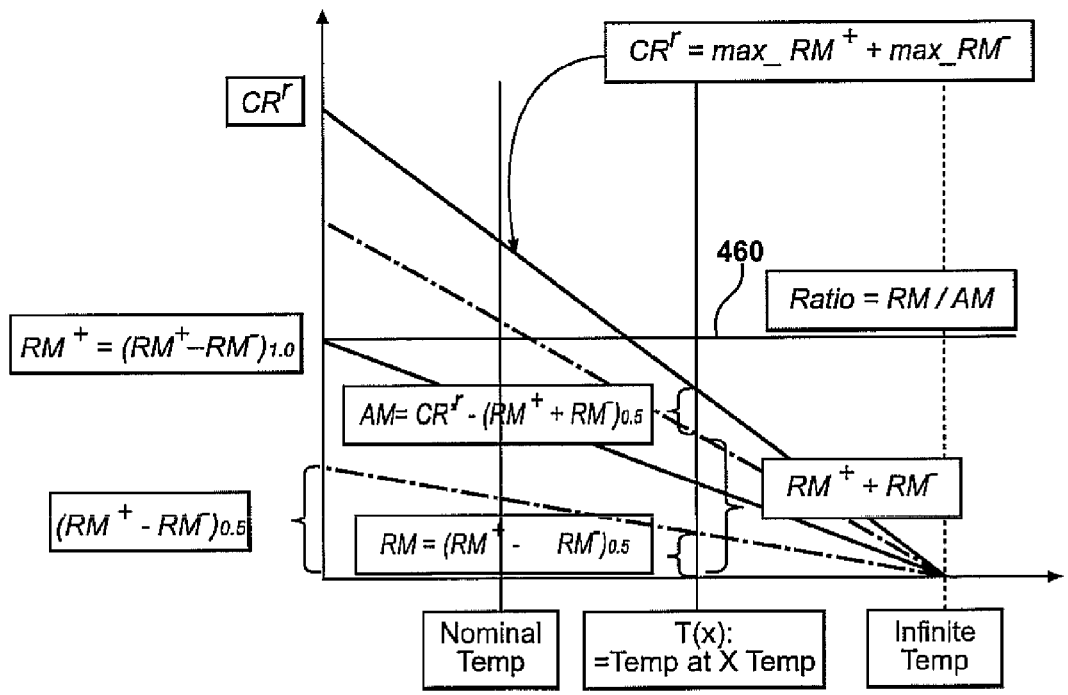
FIG. 16 illustrates improved temperature correction.

FIG. 16 illustrates that when the temperature goes to an extreme maximum, the CR falls to zero at the same location as shown in the graph. Likewise the other curves go in the same direction and fall to zero at the same location.

In combinations of gap and temperature values, the ratiometric plane for two common mode signals is generally constant, while the driving voltage (CRr) plane and signal plane varies somewhat over the temperature and gap plane.

Alternative Configurations

The methods used to obtain a reference signal may be adapted for use with other sensors, such as Hall sensors.

Figure 17:
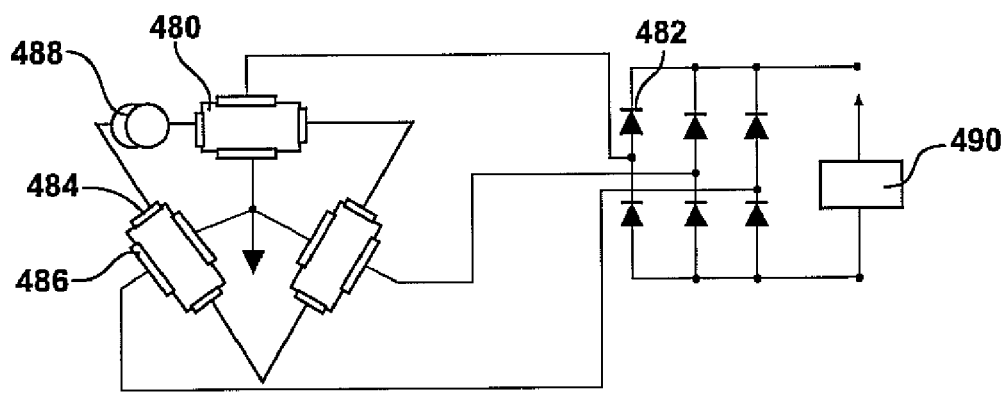
FIGS. 17 and 18 show a reference signal obtained from a 3-pole Hall sensor.
Figure 18:
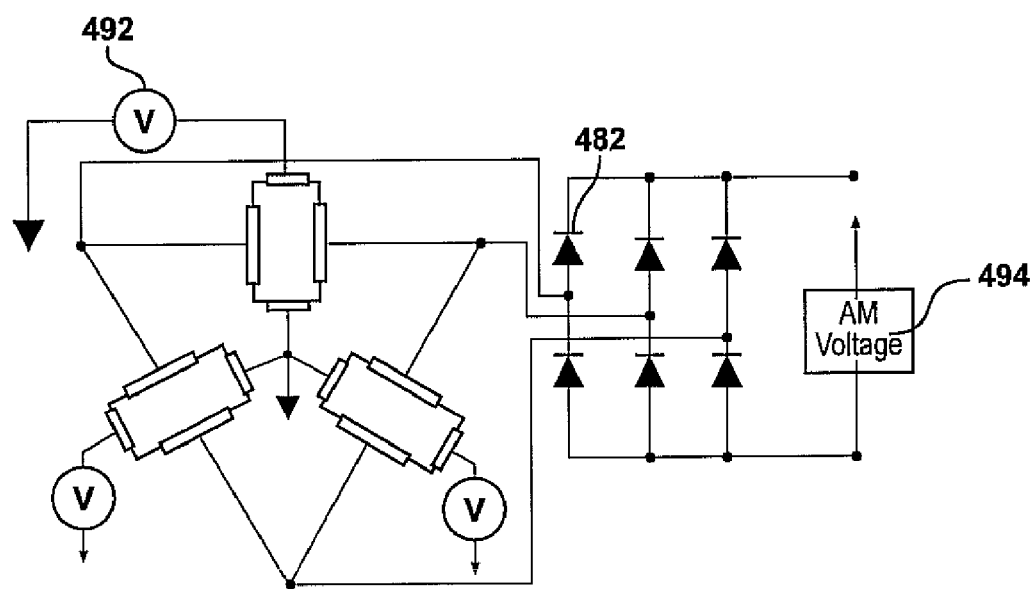

FIGS. 17 and 18 show a reference signal (AM) obtained from a 3-pole Hall sensor, which can then be used to compensate position signals from the Hall sensors for common mode factors, for example using a ratiometric approach. This has not been achieved previously in automotive applications. In these examples, the Hall sensors have star and delta geometries. These may be designed as physical geometries on a chip, or in other examples as electrical configurations of the Hall sensors, which need not have the physical orientations shown.

FIG. 17 show Hall sensors 480 in a delta configuration, with sensing and driving electrodes 484 and 486 as shown. A diode array 482 is used to obtain the reference signal output at 490.

FIG. 18 shows a star configuration of similar Hall sensors, with the reference signal output shown at 494.

Similar configurations can be used to obtain a reference signal from star and delta electrically configured receiver coils. Preferably, voltage diode drop is minimized. Hence, a reference signal (AM) can be obtained from a sum of rectified sensor signals, where the sensor signals are obtained from receiver coils, Hall sensors, capacitive sensors, piezo sensors, or other position sensors, to obtain position sensors (including fluid level sensors) compensated for common mode factors.

Examples of the present invention also include linear sensors, for example having a U-shaped or otherwise configured coupler element. Improved linear position sensors include a center-tapped receiver coil, allowing an AM signal to be produced without a separate reference coil. The AM signal may be formed by subtracting it from a baseline value, for example some fraction of the exciter voltage, either derived from a bridge circuit or an isolation transformer.

Figure 19:
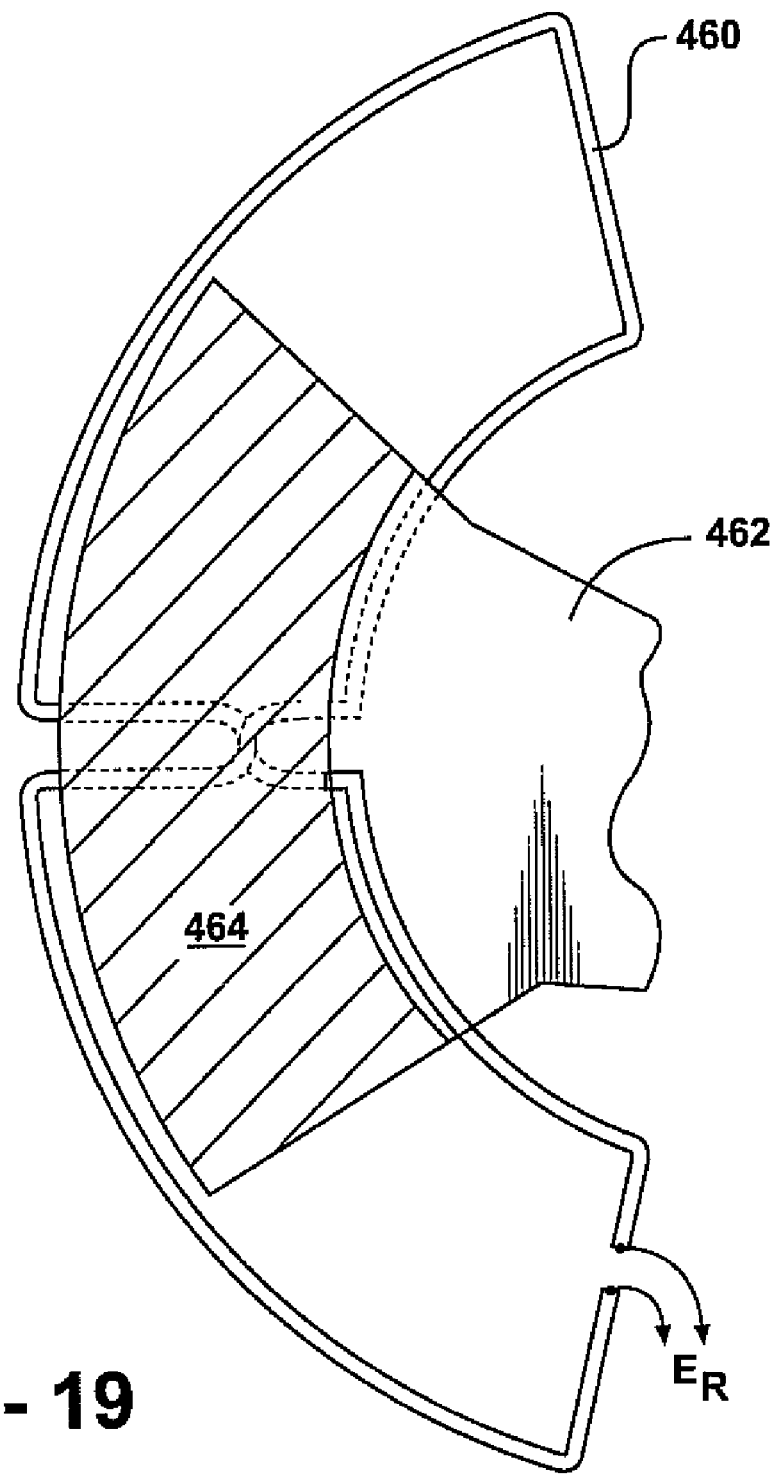
FIG. 19 shows a receiver coil used in a pedal assembly, in which a center tap may be used as part of an improved positional sensor.

FIG. 19 shows a receiver coil for an electronic throttle control, with a coupler element provided at the end of a flared end of a pedal assembly. In this example, a reference signal may be obtained using a center tap near (or within) the crossover connection of the receiver coil, for example using the configuration shown in FIG. 3, or a single loop AM coil used.

The figure shows a differential receiver coil structure 460 with output at 466, coupler element 464 as a metal plate supported at the end of a pedal arm extension 462. Depression of the pedal moves the pedal arm extension along an arcuate path, modifying the relative flux blocking to the receiver coil sections. A center tap can be included at 468 (the center tap does not have to be at the exact center), so that position dependent and position independent signals can be obtained from this coil assembly.

Inductive position sensors are described in the following commonly assigned published US Applications: 2008/0007251 (Steering angle sensor); 2007/0194782 (Inductive position sensor . . . ); 2007/0001666 (Linear and rotational inductive position sensor); 2006/0255794 (Signal conditioning system for inductive position sensor); 2006/0233123 (Inductive position sensor with common mode corrective winding and simplified signal conditioning); 2005/0225320 (Inductive position sensor); and 2005/0223841 (Inductive sensor for vehicle electronic throttle control). Embodiments of the present invention include examples described therein, adapted (for example) to include one or more tapped receiver coil, and further including an electronic circuit operable to generate position-independent signals using methods described herein, and examples in which a position-independent signal is subtracted from a baseline voltage to generate an improved reference signal.

The invention is not restricted to the illustrative examples described above, Examples are not intended as limitations on the scope of the invention. Methods, apparatus, circuits, material compositions, and the lice described herein are exemplary and not intended as limitations on the scope of the invention. Changes therein and other uses will occur to those skilled in the art. The scope of the invention is defined by the scope of the claims.

Having described my invention, we claim:

1. An apparatus for providing a signal related to a position of a coupler element, the apparatus including:
   an exciter coil, the exciter coil being operable to generate magnetic flux when the exciter coil is energized;
   a receiver coil, the receiver coil being operable to generate a receiver signal when the exciter coil is energized due to an inductive coupling between the receiver coil and the exciter coil,
   the inductive coupling being modified by movement of the coupler element so that the receiver signal is correlated with the position of the coupler element,
   the receiver coil having a first section generating a first section signal, and a second section generating a second section signal; and
   an electronic circuit, operable to generate a position-dependent signal using the receiver signal, the position-dependent signal being correlated with the position of the coupler element,
   the electronic circuit being further operable to generate a position-independent signal using the first section signal and the second section signal, the position-independent signal being substantially independent of the position of the coupler element.

2. The apparatus of claim 1, the electronic circuit being further operable to generate a ratiometric signal using the position-dependent signal and the position-independent signal.

3. The apparatus of claim 1, the apparatus being a rotational position sensor.

4. The apparatus of claim 1, the apparatus being a linear position sensor.

5. The apparatus of claim 1, the apparatus being an electronic throttle control.

6. The apparatus of claim 1, the electronic circuit being further operable to generate a reference signal,
   the reference signal being substantially independent of the position of the coupler element,
   the reference signal being generated by subtracting the position-independent signal from a baseline voltage.

7. The apparatus of claim 6, the electronic circuit being further operable to generate a ratiometric signal using the position-dependent signal and the reference signal.

8. The apparatus of claim 6, wherein the baseline voltage is obtained from an exciter signal used to energize the exciter coil.

9. The apparatus of claim 8, wherein the baseline voltage is obtained from the exciter signal using a bridge circuit.

10. The apparatus of claim 8, wherein the baseline voltage is obtained from the exciter signal using an isolation transformer.

11. The apparatus of claim 6, wherein the baseline voltage is greater than the position-independent signal.

12. The apparatus of claim 1, wherein the apparatus comprises a plurality of receiver coils, the reference signal generator receiving a plurality of receiver signals.

13. An apparatus for providing a signal related to a position of a coupler element, the apparatus including:
   an exciter coil, the exciter coil being operable to generate magnetic flux when the exciter coil is energized;
   a receiver coil, the receiver coil being operable to generate a receiver signal when the exciter coil is energized due to an inductive coupling between the receiver coil and the exciter coil,
   the inductive coupling being modified by movement of the coupler element so that the receiver signal is correlated with the part position,
   an electronic circuit, operable to generate a position-dependent signal using the receiver signal, the position-dependent signal being correlated with the position of the coupler element,
   the electronic circuit further operable to generate a reference signal, the reference signal being substantially independent of the position of the coupler element,
   the reference signal being generated by subtracting a position-independent signal from a baseline voltage.

14. The apparatus of claim 13, the receiver coil having first and second sections generating a first section signal and a second section signal respectively,
   the electronic circuit being operable to generate the position-independent signal using the first section signal and the second section signal.

15. The apparatus of claim 13, the apparatus further comprising a reference coil, the reference coil being operable to provide the position-independent signal when the exciter coil is energized due to an inductive coupling between the reference coil and the exciter coil.

* * * * *

UNITED STATES PATENT AND TRADEMARK OFFICE
CERTIFICATE OF CORRECTION

| | |
|---|---|
| PATENT NO. | : 7,482,803 B2 |
| APPLICATION NO. | : 12/016366 |
| DATED | : January 27, 2009 |
| INVENTOR(S) | : Joong K. Lee et al. |

It is certified that error appears in the above-identified patent and that said Letters Patent is hereby corrected as shown below:

Column 17, line 16, replace "lice" with --like--

Signed and Sealed this

Twenty-first Day of April, 2009

JOHN DOLL
*Acting Director of the United States Patent and Trademark Office*